United States Patent [19]
Yamada

[11] 3,788,567
[45] Jan. 29, 1974

[54] DISPOSING DEVICE FOR SYNTHETIC RESIN WASTE

[75] Inventor: Masatora Yamada, Iwata, Japan

[73] Assignee: Mitsubishi Petrochemical Company Limited, Tokyo-to, Japan

[22] Filed: Oct. 22, 1971

[21] Appl. No.: 191,754

[30] Foreign Application Priority Data
Oct. 23, 1970  Japan.............................. 45/093733

[52] U.S. Cl. ................................................. 241/247
[51] Int. Cl. ........................................... B02c 23/02
[58] Field of Search...................... 241/67, 246, 247

[56] References Cited
UNITED STATES PATENTS
940,944  11/1909  Shepard............................ 241/247
351,617  10/1886  Anderson........................... 241/247
3,398,900  8/1968  Guba et al. ........................... 241/67
650,291  5/1900  Zimmerman....................... 241/246
1,851,071  3/1932  Travis ............................. 241/67 X
3,111,278  11/1963  Buschman......................... 241/246 X

*Primary Examiner*—Granville Y. Custer, Jr.
*Attorney, Agent, or Firm*—Toren & McGeady

[57] ABSTRACT

Device for disposing of synthetic resin waste wherein the waste material of different kinds, such as polyvinyl chloride resin waste, and polyethylene resin waste mixed with sand, paper, metal pieces, etc. is processed by melting and binding the synthetic resin component in such waste material for subsequent use.

3 Claims, 5 Drawing Figures

INVENTOR.
MASATORA YAMADA

BY Torun and McHady

ATTORNEYS

DISPOSING DEVICE FOR SYNTHETIC RESIN WASTE

BACKGROUND OF THE INVENTION

Heretofore, the conventional devices for melting synthetic resin material were of an external heating system in which heat was applied externally to the barrel, so that when only the synthetic resin melts the control of the melting temperature is possible by controlling the screw rotating speed, the on-off of the heater, and by controlling the cooling water. But in case of the mixture material having a irregular component ratio such as a mixture of scrap material containing a synthetic resin, sand glass pieces etc., the control of the melting temperature is impossible. Also in the conventional device, when foreign materials such as metal pieces, sand or paper are mixed with the plastic waste, the melting of the plastic materials makes it impossible to work the device and the operation was very difficult. This is because that with the conventional device, it was necessary to keep stirring the material in the barrel, and the sand or the metal scraps twined around the screw portion or the molten resin material deposited on the shaft portion of the screw making it impossible to rotate.

Particularly, foreign substances other than synthetic resin wastes are mixed therein, and among them there are those of decomposing types of resins or those which produce harmful gases at above the melting points.

The principle of the device according to the present invention is to treat the synthetic resin wastes utilizing an internal heat generating system using a thermal action produced when the synthetic resin waste is broken or particles of the synthetic resin are sheared, so that the control of the treating temperature is stabilized. In the present invention the synthetic resin is not molten so much as in the case when formed articles are produced by melting a new synthetic resin material, the temperature is of such an extent that the synthetic resin waste is ground to produce a tackiness and bound up to lumps.

SUMMARY OF THE INVENTION

An object of the present invention is to provide a means for disposing synthetic resin waste mixed with metal pieces, sand, paper etc. together with such metal pieces, sand, paper.

Another object of the present invention is provide a means for enclosing and binding said mixture by heat produced by grinding or shearing of the particles of synthetic resin parts in said waste containing metal, sand, paper, etc.

A further object of the present invention is to provide a means which can dispose of synthetic resin materials having various kinds of properties, without producing a decomposition reaction in the disposing process.

Another object of the present invention is to provide a means for producing synthetic resin lumps containing metal, sand, paper, etc. by melting at least the surface of the synthetic resin portion by means of heat produced by grinding or shearing of synthetic resin in the synthetic resin waste.

Still another object of the present invention is to provide a means for binding and disposing of a material obtained by a preliminary grinding of the synthetic resin waste consisting of various kinds, shapes and sizes into strips or grain forms. The resin material containing foreign material and treated in the apparatus of the present invention is extruded and charged into molds for forming piles, fencing, fish-apartment mold frames, manholes and various containers.

EXPLANATION OF THE DRAWINGS

FIG. 6 is a verticle sectional view of a part of the grinding portion illustrated in FIG. 3.

DETAILED EXPLANATION OF THE INVENTION

Figure 1:
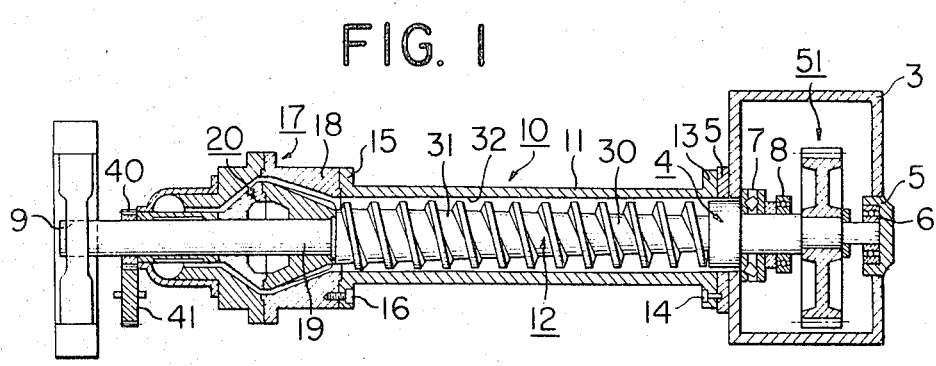
FIG. 1 is a horizontal sectional view of the device according to the present invention.

The device according to the present invention will be described referring to the drawings.

At the end portion of a machine base 1, there is provided a pedestal 2, and at the other end, a housing 3 for accommodating a driving mechanism. A rotating shaft 4 is supported at its right-hand end by means of bearings 6, 7, 8 fixed in a mounting portion 5 of the housing 3, and the left-hand end of the rotating shaft 4 is supported by a bearing portion 9 of said said pedestal 2. The side of the housing 3 on the rotating shaft 4 forms a feeding portion 10 of the material. The material feeding portion 10 is surrounded by a cylinder portion 11, and a screw portion 12 having an outer diameter forming a small gap with the inner wall of the cylinder, is provided in the material feeding portion 10 on the rotating shaft 4. The end portion of the cylinder 11 is fixed by a bolt 14 on the mounting portion 5 of the housing 3, and a left hand half 18, as viewed in FIG. 1, form an outer wall 17 for a grinding chamber and is fixed by a bolt 16 to the other end 15 of the cylinder portion 11.

Figure 4:
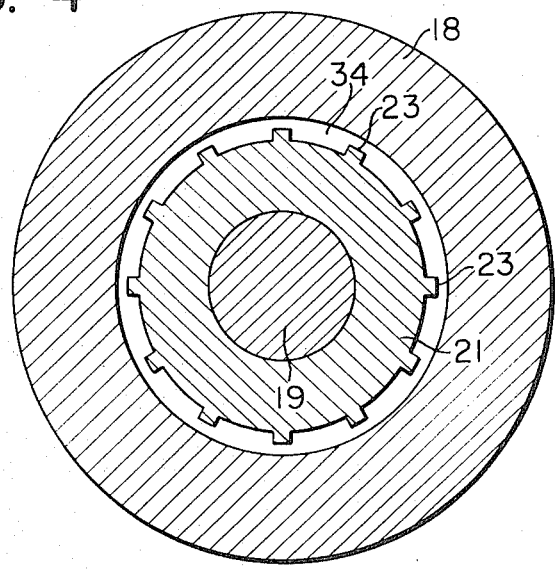
FIG. 4 is a cross sectional view along a line IV — IV IV in FIG. 3.
Figure 5:
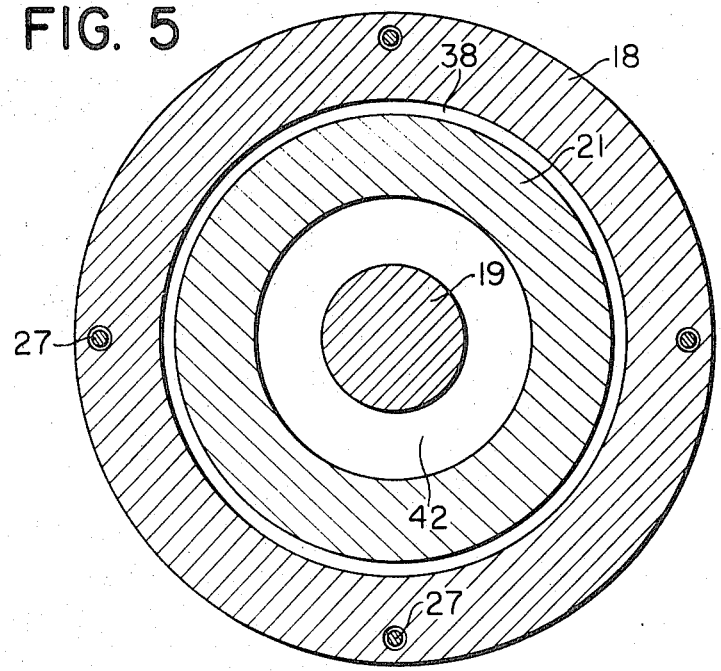
FIG. 5 is a vertical sectional view along a line V — V V in FIG. 3.

Formed continously with the screw portion 12 of the rotating shaft 4, is a reduced diameter portion 19. On this reduced diameter portion 19, there is mounted a rotating body 20 having the shape of a bead of an abacus. As indicated in FIG. 1, the right-side half 21 of the rotating body 20 is formed with an increasing taper from right to left, and on its outer periphery curved grinding ridges 23, 23 are formed, see FIG. 4, which rise toward the left and have a width gradually decreasing from the beginning (right) end to the final (left) end.

The outer periphery 25 of the left half portion 24 of said rotating body 20 tapers sharply from right to left relative to the axial line of the rotating shaft 4.

The outer periphery of the boundary portion between the right half portion 21 and the left hand portion 24 forms a plane and parallel peripheral surface 26 relative to the shaft axis.

The right half portion 28 is fixed by a bolt 27 to the right half portion 18 of the outer wall 17 of the grinding chamber.

The inner peripheral wall 29 of the left half portion 28 of the outer wall 17 of the grinding chamber have substantially a similar shape to the outer peripheral surface 25 of said rotating body 20.

With respect to the screw portion 12 of the rotating body, the shaft portion on the right end half of the screw has a uniform diameter, but the shaft portion 31 on the left end half has a gradually increasing diameter making a taper beginning from the left hand hand of shaft portion 30 on the right end half of the shaft. Accordingly, in the screw portion 12, the gap formed between the inner peripheral diameter 32 of the cylinder portion 11 and the screw portion 12 is greater at the gap formed on the right end half portion of the screw 12 than the gap formed on the left end half portion, and moreover, the gap formed on the left end half of the screw portion 12 tapers decreasingly from right to left.

The gap 34 formed between the inner peripheral wall 33 of the right end half portion 18 of the outer wall 17 of the grinding chamber and the outer peripheral surface 22 of the right half portion 21 of the rotating body decreases from right to left, and the radial gap at the reduced diameter portion of the rotating body 20 continuous with the left end of the screw portion 12 is greater than the gap at the large diameter portion of the rotating body 20.

A relatively sharply tapered annular gap 35 is formed between said inner peripheral wall 29 and the outer peripheral surface 25.

An annular gap 38 is formed between the juncture of the right half portion 18 and the left half portion 28 of the outer wall 17 and the juncture of the radially inner right half portion 21 and the left half portion 24 of the rotating body 20 is defined by the juxtaposed parallel peripheral surfaces 36, 37, Fixed on the left half portion 24 of the rotating body 20, and arranged about the reduced diameter portion of the rotating body 4 is a cylindrical portion 39, and a gear 40 is secured on the end surface of the cylindrical portion 39 see FIG. 1.

The gear 40 engages with a gear 41, the gear 41 is rotated by an appropriate driving means (not shown).

The rotating body 20 is fitted freely rotatable on the rotating shaft. The space 42 serves as a chamber for the cooling medium internally provided in the rotating body.

A cylindrical portion 43 is formed on the left half 28 of the outer wall 17. A discharge wall forming portion 44 is fixed on the outer periphery of the cylindrical portion 43.

An annular passage 47 is formed between the inner peripheral surface 45 of the cylindrical portion 43 of the left half portion 28 of the outer wall 17 and the outer peripheral surface 46 of the cylindrical portion 39 fixed on the rotating body 20. A discharging chamber 48 is formed by the inner side of the discharge wall forming portion 44 and the left end portion of the cylindrical portion 43 of the left half portion 28.

Figure 2:
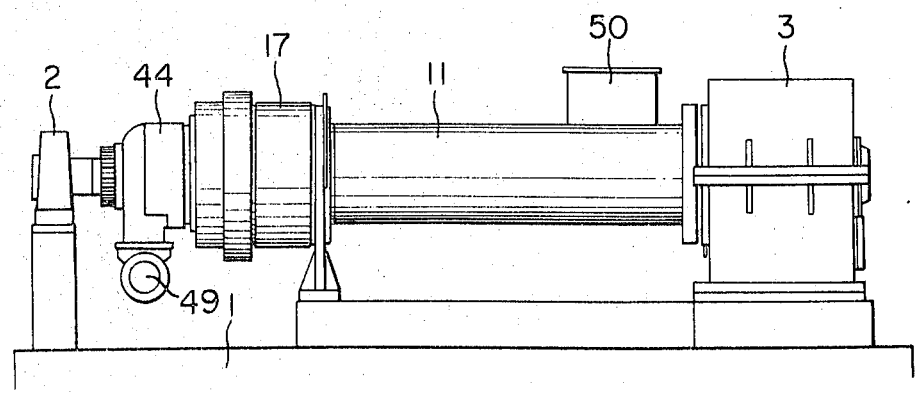
FIG. 2 is a side elevation of the device of the present invention.
Figure 3:
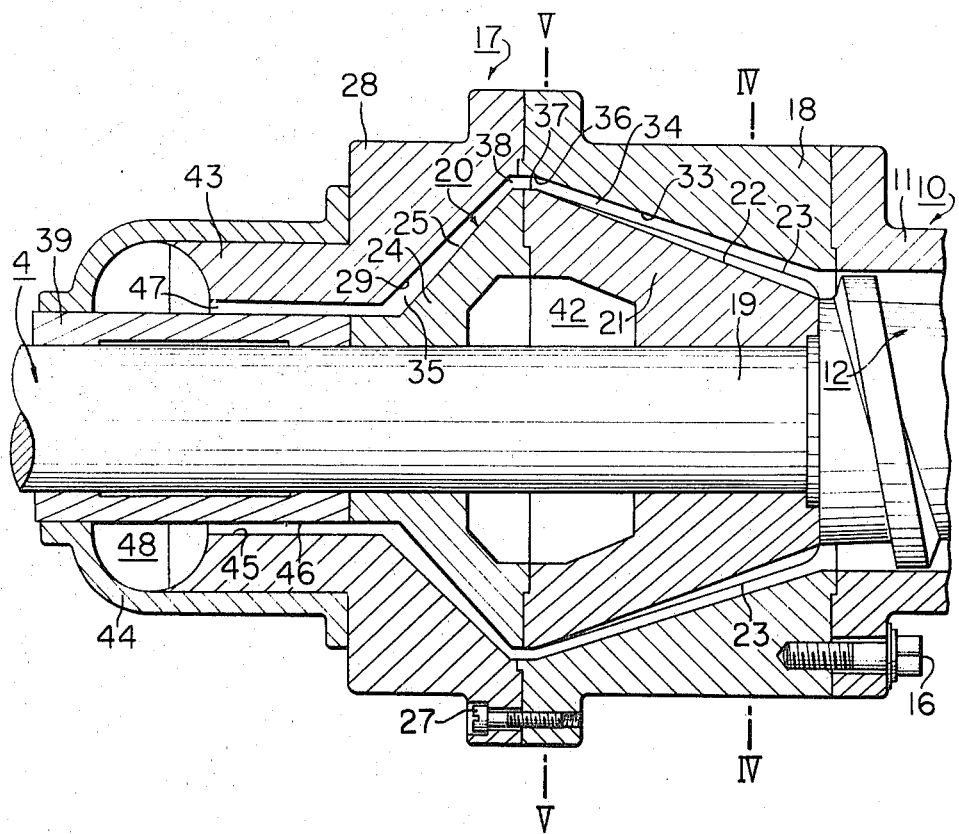
FIG. 3 is an enlarged vertical sectional view of the grinding portion for material in the device of the present invention.

With such a construction, the gap 34 continuous with the material feeding portion 10 forming the material feeding region provides the material grinding region, the parallel gap 38 continuous with the gap 34 forms a temporal staying region, and the gap 35 communicating with the gap 38, the annular gap 47 and the discharging chamber 48 form the discharge passage of the ground disposing material. The discharging chamber 48 has an outlet 49, see FIG. 2, for leading out the ground disposing material to a section conveniently. In the drawing, the numeral 50 designates a hopper for charging the material, and the numeral 51 shows a driving mechanism for rotating the shaft 4.

It is necessary that the material feeding region is designed only to serve for compressing the material including the synthetic resin waste while transferring the material from right to left, and here in this region, the synthetic resin in the material is not to be molten and mixed.

The gap in the radial direction in the material grinding region is not made too large, and in this region, the material, particularly the particles of the ground synthetic resin waste, introduced between the outer wall which is in a fixed state and the rotating body 20 which is rotating is ground or the particles are sheared by the interrelation between the rotation of the rotating body 20 and the fixed right hand half portion 18 of the outer wall 17, and at this time a self exothermic action is produced and at least the surface of the synthetic resin portion is melted. In this case, since the large-diameter portion of the rotating body 20 has a greater circumferential speed than the small-diameter portion of the rotating body 20, the grinding and shearing of the synthetic resin waste in the material is much more accelerated.

The degree of introduction of the material from the material feeding region to the material grinding region is such that the material is compressed while transferred. The material grinding region is comparatively short in the axial direction, and the slope is not too gentle, so that the synthetic resin portion produces a certain degree of adhesive force by internal heat generation under the grinding or shearing action, whereby the materials which are not those of the synthetic resin are molten to such a degree that they can be adhered. In other words, within the grinding region, the material is not to be molten so much as when a raw material containing new synthetic resin alone is molten completely to form into a formed article. In more detail, the rotating speed, shape, size of the rotating body 20, and the volume, axial distance, taper of the material grinding region are so so that the melting temperature of the synthetic resin portion will not rise above the melting point of the synthetic resin.

The above described device is operated as follows:

Operating the driving mechanism 51 by a motor (not shown) to rotate the rotating shaft 4, and at the same time the gear 40 is rotated by any suitable driving mechanism to rotate the rotating body 20.

The synthetic resin waste material adhering to or mixed with dust, stone, wood pieces, paper or metal pieces is charged into the material feeding region from the hopper 50.

With the rotation of screw portion 12 of the rotating shaft, the material introduced into the material feeding region is transferred to the left, and is compressed. The shaft portion 31 is tapered at the left side of the screw portion, and the feeding space is gradually narrowed so that the material is somewhat ground. Gradually, the material is pressed and forwarded to the material grinding region by means of the screw portion 12. In the material grinding region, the material is flung around frictionally by the rotation of the rotating body 20 and the outer wall 17 which is at rest. Under such a condition, the synthetic resin portion in the material is ground or sheared rapidly, so that the material produces an internal exothermic action within a very short period while it is transferred from the small diameter portion to the large diameter portion of the rotating body 20. Accordingly, the synthetic resin, for example, polyvinyl chloride resin, which is readily decomposed thermally, will not give time for producing thermal decomposition because of the softening and melting within such a rapid and short period.

In this case, the guide ridges 23, 23, ... protruding from the rotating body 20 promote the grinding and shearing actions on the synthetic resin portion.

In this way, although the resin material is a decomposition type, such as polyviyl chloride resin, polystyrene resin, it can be treated without producing decomposition gas. Next, the ground material (in this case, sand, paper, etc. included therein) is introduced into the annular, parallel gap 38.

The ground material having an adhesive property staying temporarily in this annular, parallel gap is pushed by following ground material and passes through gaps 35, 47, and is discharged to an a convenient station through the discharge chamber 48.

The principle of the present invention is to combine and dispose of synthetic resin waste material utilizing the internal heat produced by friction when the synthetic resin portion in the synthetic resin waste material is ground or sheared. Thus internal heat generated is controlled by the characteristic property of the synthetic resin portion itself in the synthetic resin waste material.

In this case, it is necessary that the synthetic resin material contained in the scrap material is at least 15 percent of said scrap material. In this embodiment, the rotating shaft 4 and the rotating body 20 are separated, but it is possible for the rotating shaft 4 and the rotating body 20 to be rotated integrally.

An example of the device according to the present invention will now be described.

EXAMPLE 1

Polyvinyl chloride resin waste material was previously broken into small pieces and subjected to a grinding treatment by the device of the present invention and as the result obtained lump material without producing thermal decomposition. Of course, during such treatment no detrimental gas was produced.

EXMAPLE 2

Synthetic resin waste containing a great amount of dust and paper, namely 30% of synthetic resin, 70% of dust and paper, was subjected to the grinding treatment using the present apparatus. As the result, lump material made of dust and paper, compacted with the synthetic resin was obtained.

What is claimed is:

1. Disposing device for synthetic resin waste comprising an axially extending hollow cylinder having a first end and a second end, an annular-shaped wall coaxial with said cylinder and connected to and extending from the second end of said cylinder, a rotatable shaft positioned within and extending through said cylinder and annular-shaped wall, said shaft spaced radially inwardly from said cylinder and annular-shaped wall, a continuous screw portion formed on said shaft between the first end and the second end of said cylinder and extending outwardly from said shaft and spaced inwardly from the inner surface of said cylinder and the combination of said shaft, continuous screw portion and cylinder forming an anular-shaped axially extending material heating region through said cylinder, a body concentrically mounted on said shaft and extending axially outwardly from the second end of said cylinder and located within and spaced inwardly from the inner surface of said annular-shaped wall and forming an annular space therebetween in communication with the space between said cylinder and shaft, the inner surface of said annular-shaped wall and the outer surface of said body disposed in spaced relationship and each consisting of a first axially extending portion, a second axially extending portion, and a third axially extending portion, each of said first portions, each of said second portions and each of said third portions being of substantially the same axial length and with said first portions located contiguous to the second end of said cylinder, the inner surface of the first portion of said annular-shaped wall and the outer surface of the first portion of said body taper outwardly from said screw portion at the second end of said cylinder, the inner surface of the second portion of said annular-shaped wall and the outer surface of the second portion of said body being in substantially parallel relation with one another and with the axis of said shaft for the axial length of said second portions, and the inner surface of the third portion of said annular wall and the outer surface of the third portion of said body tapering inwardly toward the surface of said shaft, the first portion of said body and of said annular-shaped wall forming a grinding region with their surfaces converging toward one another from the second end of said cylinder to said annular space defined between the second portions of said annular-shaped wall and body, and the third portions of said body and of said annular-shaped wall having their surfaces disposed in diverging relationship from said second portions toward the opposite ends of said third portions.

2. Disposing device, as set forth in claim 1, wherein said body is rotated separately from said shaft, and means for rotating said body.

3. Disposing device, as set forth in claim 1, wherein the outer surface of the first portion of said body forms outwardly projecting ridges for increasing the frictional force produced by the rotation of said body.

* * * * *